US010839026B2

(12) United States Patent
Trillo Vargas et al.

(10) Patent No.: US 10,839,026 B2
(45) Date of Patent: Nov. 17, 2020

(54) KNOWLEDGE MANAGEMENT BY CONNECTING USERS

(71) Applicant: International Business Machines Corporation, Armonk, NY (US)

(72) Inventors: Jesus Gabriel Trillo Vargas, Guadalajara (MX); Adolfo Mendez Morales, Guadalajara (MX); Juan Manuel A. Vega, Guadalajara (MX)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 15/822,273

(22) Filed: Nov. 27, 2017

(65) Prior Publication Data

US 2019/0163825 A1 May 30, 2019

(51) Int. Cl.
*G06F 16/00* (2019.01)
*G06F 16/951* (2019.01)
*G06F 16/953* (2019.01)
*H04L 12/58* (2006.01)

(52) U.S. Cl.
CPC .......... *G06F 16/951* (2019.01); *G06F 16/953* (2019.01); *H04L 51/04* (2013.01)

(58) Field of Classification Search
CPC .... G06F 16/3338; G06F 16/951; G06F 16/35; G06F 16/285; G06F 16/335
See application file for complete search history.

(56) References Cited

U.S. PATENT DOCUMENTS

| | | | |
|---|---|---|---|
| 2002/0184166 A1 | 12/2002 | Jackson et al. | |
| 2006/0036563 A1 | 2/2006 | Wu | |
| 2007/0061128 A1* | 3/2007 | Odom | G06F 19/325 704/4 |
| 2007/0282805 A1* | 12/2007 | Janzen | G06F 16/217 |
| 2009/0063387 A1* | 3/2009 | Beaty | G06N 5/04 706/50 |
| 2009/0171935 A1* | 7/2009 | Birsan | G06F 16/951 |
| 2011/0055699 A1* | 3/2011 | Li | G06F 16/951 715/709 |

(Continued)

FOREIGN PATENT DOCUMENTS

| | | | |
|---|---|---|---|
| JP | 1049375 | 2/1998 | |
| JP | 201154848 | 11/1999 | |
| WO | WO-0188848 A2 * | 11/2001 | G06Q 10/06 |

OTHER PUBLICATIONS

Clearwater, et al., Cooperative Problem Solving, Computation: The Micro and the Macro View, pp. 33-70, World Scientific 1992, 26 pages.

*Primary Examiner* — Augustine K. Obisesan
(74) *Attorney, Agent, or Firm* — Schmeiser, Olsen & Watts, LLP; Nicholas L. Cadmus

(57) ABSTRACT

A knowledge management system and method may include receiving a first set of keywords used to describe a problem from a first user, storing in a coincidence database a domain sample related to the domain of the problem and a context sample from the set of keywords, searching a knowledge management repository containing potential solutions to the problem, determining that a solution to the problem does not exist in the knowledge management repository, locating a second user that has previously described the problem, determining that the first user and the second user are a collaborative match, and connecting the first user to the second user.

20 Claims, 13 Drawing Sheets

(56) References Cited

U.S. PATENT DOCUMENTS

| | | | |
|---|---|---|---|
| 2012/0101807 A1* | 4/2012 | Heo | G06F 16/3331 |
| | | | 704/9 |
| 2013/0097027 A1 | 4/2013 | Wang et al. | |
| 2013/0275458 A1* | 10/2013 | Bhatt | G06F 16/3331 |
| | | | 707/769 |
| 2014/0052645 A1* | 2/2014 | Hawes | G06Q 10/20 |
| | | | 705/304 |
| 2014/0280294 A1* | 9/2014 | Stekkelpak | G06F 16/9535 |
| | | | 707/769 |
| 2014/0310035 A1 | 10/2014 | Declerck et al. | |
| 2014/0365461 A1* | 12/2014 | Buryak | G06F 16/3323 |
| | | | 707/710 |
| 2015/0317383 A1 | 11/2015 | Alkov et al. | |
| 2016/0239487 A1* | 8/2016 | Potharaju | G06F 16/93 |
| 2017/0011308 A1 | 1/2017 | Sun et al. | |
| 2018/0121929 A1* | 5/2018 | Cheng | G06Q 30/016 |

\* cited by examiner

152 ↘

Coincidence Database

| Search | Domain Sample | Context Sample | Searcher ID |
|---|---|---|---|
| how to use agile for business analysis global roles | business | agile business analysis global role | identity9999 |
| using agile in global business analysis | business | agile global business analysis | identity9999 |
| how to use agile for business analysis global roles | business | agile business analysis global role | person1234 |
| using agile in global business analysis | business | agile global business analysis | person1235 |
| global roles for business using agile analysis | business | global roles business using agile analysis | person1236 |

Trend Database

| Searcher ID | Context | Domain | Counter | Time Stamp |
|---|---|---|---|---|
| identity9999 | agile global business analysis | business | 1 | 1 11.2.17 |
| person1234 | agile global business analysis | business | 2 | 2 10.30.17 |

| Collaborator Database | | | | |
|---|---|---|---|---|
| Collaborator List - User ID | Location | Language | Anonymity? | Collaborate? |
| identity9999 | United States | English | Y | Y |
| person12344 | United States | English | N | Y |
| user4444 | Korea | English | Y | N |
| searcher7777 | Canada | English | N | Y |

KNOWLEDGE MANAGEMENT BY CONNECTING USERS

TECHNICAL FIELD

The present invention relates to systems and methods for managing knowledge and information. More specifically, the invention relates to systems and methods for managing knowledge and information by facilitating the connection of users having similar problems.

BACKGROUND

There are many ways in which people solve similar problems independently from each other without knowing that others are attempting to solve, or have already solved, the same problem. In many circumstances, time is wasted because no process exists to report when a problem arises and quickly ascertain if that problem has already been solved, or is currently trying to be solved. Time is wasted and learning is slowed because people are not provided with an understanding that others are attempting to solve, or have solved, the same problem as them. Still further, time is wasted and learning is slowed because people are unable to contact others that are attempting to solve, or have solved the same problem as them.

At present, there is no way for a plurality of internet users attempting to solve the same problem using a search engine to interact based. No data structure and accompanying process or method is provided in the internet that connects problem solvers attempting to search for an answer to the same problem on the internet.

SUMMARY

An embodiment of the present invention relates to a method, and associated computer system and computer program product, for knowledge management by connecting users. A processor of a computing system receives a first set of keywords used to describe a first problem from a first user. A first domain sample related to a domain of the first problem and a first context sample from the first set of keywords are stored by the processor in a coincidence database. A knowledge management repository containing potential solutions to the first problem is searched by the processor. It is determined by the processor that a solution to the first problem does not exist in the knowledge management repository. A second user that has previously described the first problem is located by the processor. It is determined by the processor that the first user and the second user are a collaborative match. The first user and the second user are connected by the processor.

BRIEF DESCRIPTION OF THE DRAWINGS

FIG. 9A depicts a coincidence database, in accordance with embodiments of the present invention.

FIG. 9B depicts a trend database, in accordance with embodiments of the present invention.

FIG. 9C depicts a collaborators database, in accordance with embodiments of the present invention.

DETAILED DESCRIPTION

Currently users input problems into a search engine such as Google®, Yahoo®, Bing®, or the like. The search engine then locates and provides results that are determined by the search engine to likely contain a solution to the problem being searched for by the user. However, often times the solution is not found within the search results returned by the search engine, and a user or problem solver is forced to re-word the problem or search. Sometimes it is the case that no solution is found after several attempts by the user. Many users may simultaneously be using the search engine to attempt to solve the same problem unbeknownst to each other despite the fact that collaboration is known to significantly reduce the time spent trying to solve problems. At present, no database structure exists for storing specific information related to the problems people are trying to solve in a manner that facilitates using those databases in methods for efficiently connecting users or problem solvers attempting to solve the same problem.

Thus, there is a need for a knowledge management system and accompanying database structures, along with processes that utilize those database structures, that facilitate connecting users having the same or similar problems.

Figure 1:
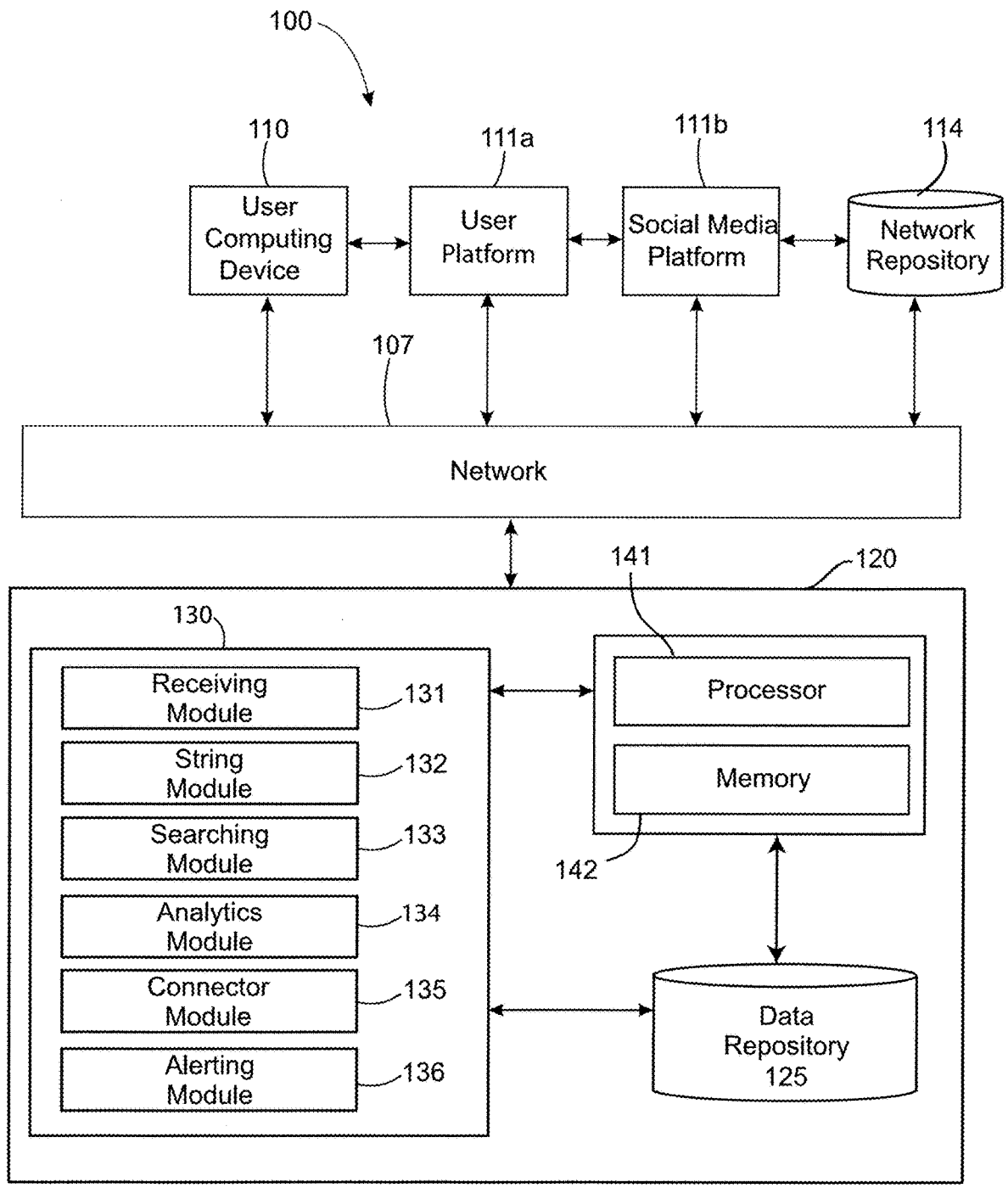
FIG. 1 depicts a block diagram of a knowledge management system, in accordance with embodiments of the present invention.

Referring first to FIG. 1, a block diagram of a knowledge management system 100 is shown, in accordance with embodiments of the present invention. Embodiments of the knowledge management system 100 may be a system for connecting users having the same or similar problems. Embodiments of the knowledge management system 100 may be useful for users seeking to solve a problem. Problems may include or relate to satisfying a need for: finding information on a topic, finding or locating a vendor to perform a service or provide a good, finding a location, diagnosing a patient, fixing a broken object, learning how to perform an activity, or the like.

Embodiments of the knowledge management system 100 may be a problem solving system, a problem solver connection system, a context-based knowledge management system, a system for reducing a learning curve for users, a social media platform connection system, a solution finding system, a user connection interface system, and the like. Embodiments of the knowledge management system 100 may include a computing system 120. Embodiments of the computing system 120 may be a computer system, a computer, a server, one or more servers, a cloud computing device, a hardware device, a remote server, and the like.

Furthermore, embodiments of knowledge management system 100 may include a user computing device 110, one or more user platforms 111, and one or more social media platforms 111*b*, communicatively coupled to a computing system 120 of the knowledge management system 100 over a network 107. For instance, information/data may be transmitted to and received from the user computing device 110 and the one or more social media platforms 111*b* and/or the one or more user platforms 111*a* over a network 107. A network 107 may be the cloud. Further embodiments of network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA or a mobile communications data network. The architecture of the computer network 107 may be a peer-to-peer network in some embodiments, wherein in other embodiments, the network 107 may be organized as a client/server architecture.

In some embodiments, the network 107 may further comprise, in addition to the computing system 120, a connection to one or more network-accessible knowledge bases 114 containing information of the user, user browsing search history, product information, social media activity, network repositories or other systems connected to the network 107 that may be considered nodes of the network 107. In some embodiments, where the computing system 120 or network repositories allocate resources to be used by the other nodes of the network 107, the computing system 120 and network repository 114 may be referred to as servers.

The network repository 114 may be a data collection area on the network 107 which may back up and save all the data transmitted back and forth between the nodes of the network 107. For example, the network repository may be a data center saving and cataloging user social media activity data, user searching history data, and the like, to generate both historical and predictive reports regarding a particular user or a user's search of a topic, and the like. In some embodiments, a data collection center housing the network repository 114 may include an analytic module capable of analyzing each piece of data being stored by the network repository 114. Further, the computing system 120 may be integrated with or as a part of the data collection center housing the network repository 114. In some alternative embodiments, the network repository 114 may be a local repository that is connected to the computing system 120.

Embodiments of the user computing device 110 of the knowledge management system 100 may be a user device, a cell phone, a smartphone, a user mobile device, a mobile computer, a tablet computer, a PDA, a smartwatch, a dedicated mobile device, a desktop computer, a laptop computer, or other internet accessible device or hardware. Embodiments of the user platform 111*a* may be one or more databases, storage devices, repositories, servers, computers, engines, and the like, that may service, run, store or otherwise contain information and/or data. The user platform 111*a* may be accessed or may share a communication link over network 107, and may be managed and/or controlled by a third party, such as a search engine company. In an exemplary embodiment, the user platform 111*a* may be a search engine platform, search engine website, or the like, configured to interface over the network with a search engine. The user platform 111*a* may include the ability for a user to create a user ID, log in with the user ID, and interact with the user platform 111*a* while logged in.

Embodiments of the one or more social media platforms 111*b* of the knowledge management system 100 may be one or more databases, storage devices, repositories, servers, computers, engines, and the like, that may service, run, store or otherwise contain information and/or data regarding a social media network of the user and the user's social contacts. The social media platform or platforms 111*b* may be accessed or may share a communication link over network 107, and may be managed and/or controlled by a third party, such as a social media company. In an exemplary embodiment, the social media platforms 111*b* may be a social media network, social media website, social media engine, and the like, which may store or otherwise contain content supplied by a social contact of the user. The social media platform 111*b* may include the ability for a user to create a user ID, log in with the user ID, and interact with the social media platform 111*b* while logged in.

Further, embodiments of the computing system 120 may be equipped with a memory device 142 which may store various data/information/code, and a processor 141 for implementing the tasks associated with the knowledge management system 100. In some embodiments, an knowledge management application 130 may be loaded in the memory 142 of the computing system 120. The computing system 120 may further include an operating system, which can be a computer program for controlling an operation of the computing system 120, wherein applications loaded onto the computing system 120 may run on top of the operating system to provide various functions. Furthermore, embodiments of computing system 120 may include the knowledge management application 130. Embodiments of the knowledge management application 130 may be an interface, an application, a program, a module, or a combination of modules. In an exemplary embodiment, the knowledge management application 130 may be a software application running on one or more back end servers, servicing multiple computing devices.

The knowledge management application 130 of the computing system 120 may include a receiving module 131, a storing module 132, a searching module 133, an analytics module 134, a connecting module 135, and an alerting module 136. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines. The modules 131, 132, 133, 134, 135, 136 described herein may be configured to execute various commands, tasks, perform functions, and the like. The modules 131, 132, 133, 134, 135, 136 described are exemplary. Further, the modules 131, 132, 133, 134, 135, 136 may not each be separate and distinct but may be each incorporated into a single piece of hardware, software or the like. The various commands, tasks, and functions performed by the modules 131, 132, 133, 134, 135, 136 may be achieved through any number of individual pieces of software and/or hardware and in any single "module" may not be a standalone piece of hardware and/or software separable from the other modules.

Embodiments of the receiving module 131 may include one or more components of hardware and/or software program code for receiving, detecting or otherwise being provided, sets of keywords used to describe problems by users. For instance, the receiving module 131 may determine that a user is searching for information on a given topic (e.g. how to solve a problem). In one embodiment, the user may be using a browser on the user computing device 110 on the user platform 111a in order to search the Internet for information on the topic, whereby the search request may be received by the receiving module 131 from the user platform 111a. The user may enter one or more search terms within a search engine, which may be detected and/or received by the receiving module 131. In another exemplary embodiment, the user may be searching for an answer to a problem, and the search request may be received by the receiving module 131. In another embodiment, the receiving module 131 may detect a user's activity on one or more social media platforms 111b (e.g. a user posting about the desire to solve a problem). In yet another embodiment, the receiving module 131 may detect and receive user searching activity from a combination of sources and methods to determine that the user is searching to solve a particular problem.

Embodiments of the computing system 120 may further include the storing module 132. Embodiments of the storing module 132 may include one or more components of hardware and/or software program sending information to the data repository 125 for storage.

The storing module 132 may be configured to store domain samples related to one or more domains of each problem sought to be solved by searches entered by users into the user platform 111a, the social media platform 111b, or the like. A domain sample may include a field, area or subject of the problem sought to be solved. Examples of a domain sample may be math, physics, chemistry, business, social, engineering, psychology, or the like. Various domains are contemplated. The knowledge management system 100 may be configured to receive broad or specific domains depending on the embodiment. The storing module 132 may further be configured to store a context sample in the data repository 125. The context sample may be a portion of the keywords used to describe a problem submitted by a user. The context sample may include some or all of the keywords found in the problem.

Figure 2:
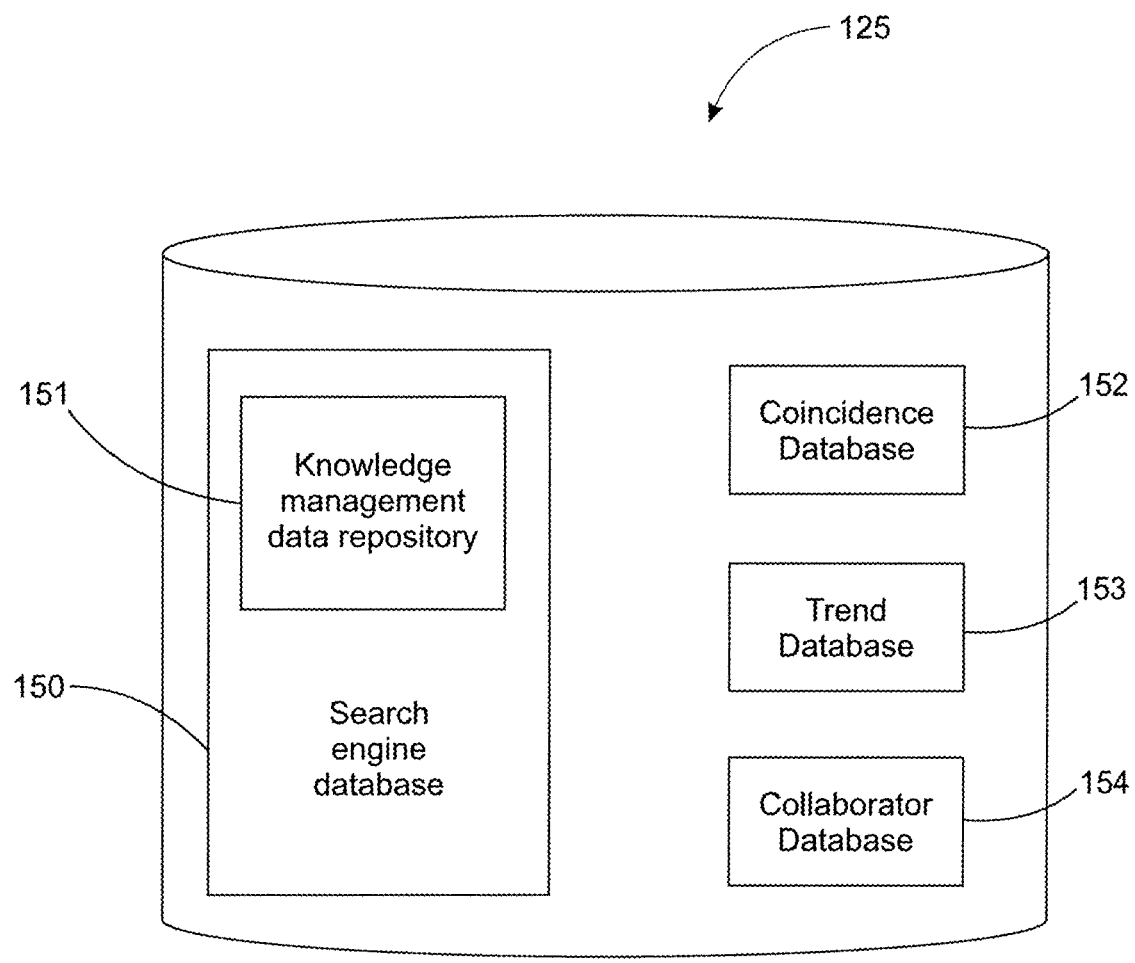
FIG. 2 depicts a data repository, in accordance with embodiments of the present invention.

Shown in FIG. 2, the storing module 132 may be configured to store the context sample and the domain sample in a coincidence database 152 of the data repository 125. An example of a coincidence database 152 is shown in FIG. 9A. The coincidence database 152 may include a search column 161 that stores the specific words or keywords searched by a user. The coincidence database 152 may include a domain sample column 162 for storing the domain samples for each problem searched by the user. The coincidence database 152 may include a context sample column 163 for storing context samples for each problem searched by the user. The coincidence database 152 may further include a searcher ID column 164 for storing a user ID, login ID or the like that corresponds or is otherwise related to the user performing the keyword search. The coincidence database 152 may store information related to each search performed by the user on the user platform 111a. In other embodiments, the coincidence database 152 may store domain and context data related to social media posts made on the social media platform 111b by the user related to a problem that the user is attempting to solve.

The storing module 132 may further be configured to store trend information in the data repository 125. Trend information may relate to incidences of when a user attempts to search for solutions to the same problem multiple times using similar or the same search parameters, keywords, words, phrases or the like. Specifics of how the knowledge management system 100 determines if a trend occurs will be described in detail herein below. In one embodiment, a domain trend may be stored when a user makes multiple attempts to solve the same problem. The domain trend may be similar or the same as the domain sample stored in the coincidence database 152. A context trend may also be stored when a user makes multiple attempts to solve the same problem. The context trend may be similar or the same as the context samples 163 found in the coincidence database 152.

Shown in FIG. 2, the storing module 132 may further be configured to store trend information in a trend database 153. An example of a trend database 153 is shown in FIG. 9B. The trend database 153 may include a searcher ID column 171 that stores a user ID, login ID, or the like that correlates to a user creating the keyword search trend. The trend database 153 may further include a context trend column 172 for storing the context trend. Each context trend entry may include a combination of context samples 163 from the coincidence database 152. Hereafter, it should be understood that "entry" refers to a row in the database examples shown. However, the databases may alternatively be created so that a column relates to an entry. Whatever the embodiment, an entry may pertain to an individual search, trend or collaborator. Each context trend entry may include shared keywords found in the search terms from the same user in the coincidence database 152. The trend database 153 may further include a domain trend column 173 for storing the domain of the trend. The trend database 153 may further include a counter column 174 for storing a count of the number of times a user has sought to solve the same problem through a search on the user platform 111a, a search of post on the social media platform 111b, or the like. The trend database 153 may further include a time stamp of the last time the user sought to solve the same problem through a search.

The knowledge management system 100 may be configured to delete entries in the trend database 153 based on a predetermined schedule. For example, entries (or rows) in the trend database 153 having a higher counter level may be configured to remain in the trend database 153 longer than entries in the trend database 153 having a lower counter level. Thus, the more persistent a user is in trying to solve the problem, the more important the problem may be to the user, and the longer the knowledge management system 100 may retain the trend entry in the trend database 153.

While one trend database 153 is shown, the data repository 125 of the knowledge management system 100 may include multiple trend databases 153. In one embodiment, each counter level may have its own trend database. In this embodiment, for example, the counter level 1 may be a day database that deletes entries after a day, the counter level 2 may be a week database that deletes entries after a week, the counter level 3 may be a month database that deletes entries after a month, and the counter level 4 database may be a quarter database that deletes entries after a quarter.

The storing module 132 may further be configured to store collaborator information into the data repository 125. Collaborator information may be information related to a user performing searches and attempting to solve problems through the user platform 111a, the social media platform 111b, or the like. Collaborator information may include user identification information for an account having a user ID or where the user is required to provide login information. For example, if the user platform 111a, the social platform 111b, or the like, is the interface by which the user is attempting to solve the problem, the user ID for logging into the user platform 111a, the social platform 111b, or the like, may be included in the collaborator information. Thus, information related to the user account performing the searching on the user platform 111a, the social platform 111b, or the like, may be stored in the data repository 125.

Shown in FIG. 2, the storing module 132 may be configured to store the collaborator information in a collaborator database 154. An example of a collaborator database 154 is shown in FIG. 9C. The collaborator database 154 may include a collaborator list column 181 configured to store user ID information of users attempting to solve a similar problem. The collaborator database 154 may include a location column 182 that stores a location of the users, and a language column 183 that stores the language used to describe the problem or the native language of each user. In other embodiments, a column may be included in the collaborator database keeping track of Akamai information to determine if a user used the same Akamai server. The knowledge management system 100 may be configured to prioritize connecting users based on collaborator information such as shared proximate location and shared language. In the embodiment shown, a new collaborator database 181 is included for each separate problem shared by a plurality of users in the trend database. In other examples, a large collaborator database may include user information on all or many users of the user platform 111a or the social media platform 111b and may not be a problem-specific collaborator database. The collaborator database 154 may further include an anonymity column 184 that stores a binary denotation of whether a user wishes to remain anonymous (e.g. "yes" or "no"). The collaborator database 154 may further include a collaboration column 185 that stores a binary denotation of whether a user wishes to collaborate (e.g. "yes" or "no"). The computing system 120, analytics module 134 and/or connector module 135 may use to ensure that connections are made in conformity with a user's preferences of anonymity, or to determine that a user wishes to forgo being connected with other users.

Embodiments of the computing system 120 may further include the searching module 133. Embodiments of the searching module 133 may include one or more components of hardware and/or software program code for searching a knowledge management data repository 151 (shown in FIG. 2). The knowledge management data repository 151 may be a search engine database or databases 150 or may be incorporated into a search engine database or databases 150. The searching module 133 may be configured to search the knowledge management data repository 151 and find results that relate to a search request made by a user attempting to solve a problem by searching for a solution.

Embodiments of the computing system 120 may further include the analytics module 134. Embodiments of the analytics module 134 may include one or more components of hardware and/or software program code for analyzing various aspects of the methods performed by the knowledge management system and make determinations. The analytics module 134 may be a natural language cognition tool (e.g. WATSON®) configured to make determinations based on language recognition software and/or algorithms. Furthermore, the analytics module 134 may be particularly configured to interact with the data repository 125 and the databases found within the data repository 125 to user, organize, evaluate, analyze, and the like, the data input by users submitting searches and/or trying to solve problems.

For example, the analytics module 134 may be configured to determine that a solution to a problem attempting to be solved by a user either does or does not exist in the knowledge management repository 151. This determination may be made, for example, by providing an algorithm that determines that a user cannot find the solution to a problem because the user is submitting different keyword searches in an attempt to solve the problem. In one embodiment, the analytics module 134 may determine that no solution readily exists in the management repository to a user's problem if the user submits four or more separate but similar searches. In another embodiment, the analytics module 134 may determine that no solution readily exists in the management repository to a user's problem if the user submits two, three or four separate but similar searches.

The analytics module 134 may be configured to determine that the domain samples in the coincidence database 152 are the same or different for two searches in order to identify a trend.

The analytics module 134 may be configured to determine that two context samples from two searches performed by a user are matched. To determine that two context samples from two searches are matched, the analytics module 134 may be configured to determine that the first context sample of a first search and the second context sample of a second search are matched using a natural language cognition tool to determine that a coincidence level is above a threshold. For example, the threshold may be 60% in one embodiment. In other embodiments, the threshold may be 40%, 50%, 70%, 80%, 90% or up to 100%. In an exemplary embodiment, the analytics module 134 may utilize the natural language cognition tool to determine keywords associated with the content of the search performed by the user, and then examine the determined keywords with keywords that may be relatable with the topic or a product, location, service, service provider, etc. captured or otherwise encompassed by the search. In yet another embodiment, the analytics module 134 may use a combination of natural language techniques, cognitive applications/engines, and visual recognition engines to determine whether the two searches performed by the user are matched.

Further, the analytics module 134 may be configured to determine whether two users attempting to solve, or who have attempted to solve, the same problem are a collaborative match. For example, the analytics module may use the information in the collaborator database 154 to determine that a first user currently attempting to solve a problem is best matched with a second user who once attempted to solve the problem. The analytics module 134 may be configured to choose the second user from a plurality of potential users, each of which may have attempted to solve the problem, by determining that the second user is proximately located to the current user and shares a common language. Other examples of prioritization to achieve a collaborative match may include sharing Akamai servers, age, gender, interests, cognitive approaches, or the like.

Embodiments of the computing system 120 may further include an alerting module 136. Embodiments of the alerting module 136 may include one or more components of hardware and/or software program code for alerting a first user by the knowledge management system 100 that a second user exists that shares a common interest in solving the same problem as the first user. The alerting module 136 may be activated once the analytics module 134 determines that the second user exists for a possible collaboration to solve the problem. Once activated, the alert module 136 may provide a message onto the screen of the first user in response to an attempt by the first user to solve the problem. This message may alert the first user that a collaborative match exists and that the second user is shares a common interest in solving the same problem. The alert may also query the user to determine whether the first user wishes to collaborate with the second user to solve the problem.

Figure 3:
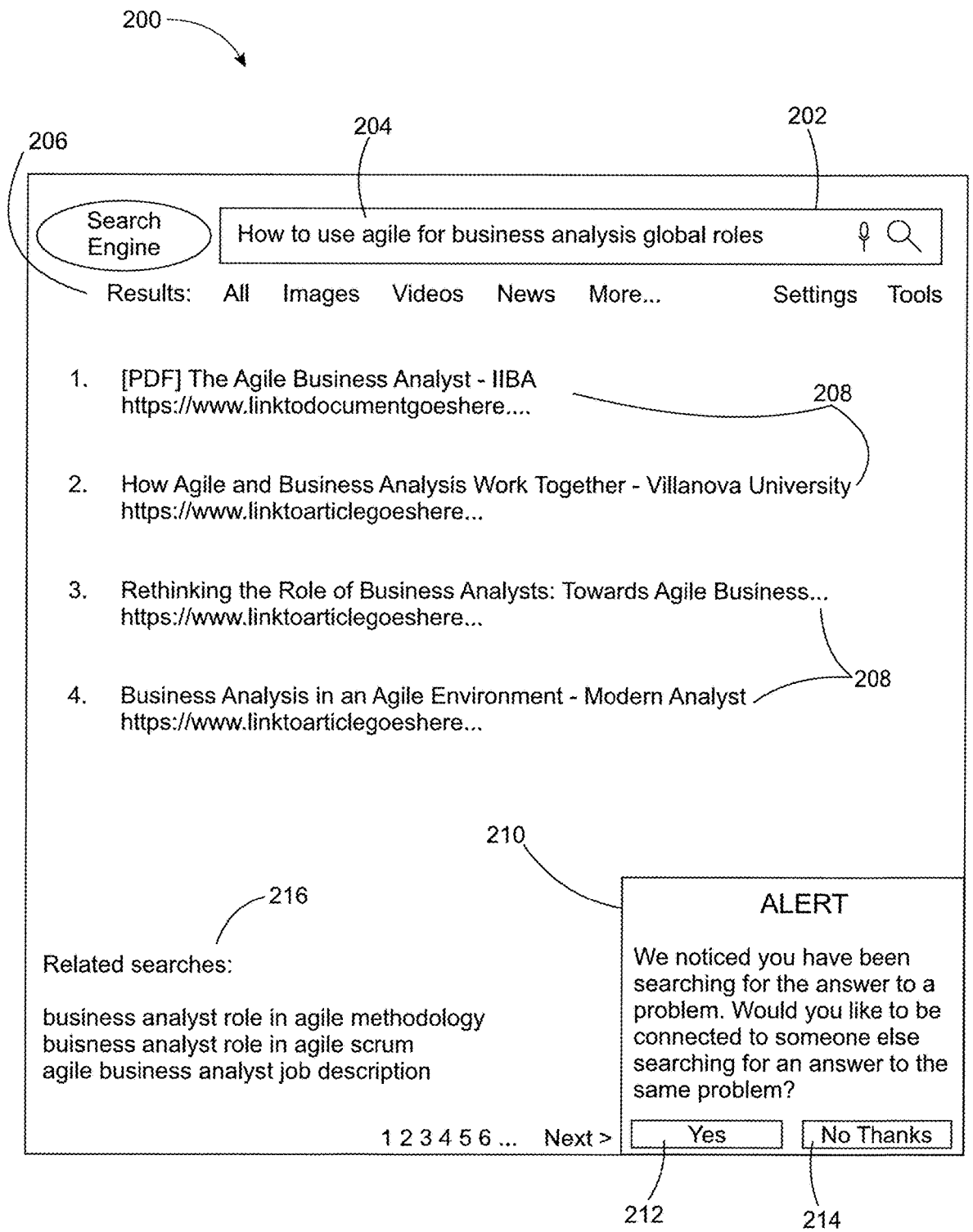
FIG. 3 depicts a search results page of a user with a collaboration alert, in accordance with embodiments of the present invention.

An example embodiment of an alert generated by the alerting module 136 is shown in FIG. 3. In this embodiment, a search result page 200 is shown. The search result page 200 may be an interface provided by the user platform 111*a*, the social media platform 111*b* or the like. The search result page 200 shows that a first user has submitted a search 204 in a search box 202. Results 208 have been returned to the first user. Further, an alert 210 is shown notifying the first user that a second user is attempting to answer the same problem as the first user and allowing the first user to collaborate by clicking a "yes" box 212 or declining the offer to collaborate by clicking a "no, thanks" box 214. The search result page 200 may further include a list of suggested related searches 216 that, if clicked on by the user, may create a trend in the trend database 153 and/or increment the counter in the trend database 153 pertaining to an already created trend.

Embodiments of the computing system 120 may further include a connecting module 135. Embodiments of the connecting module 135 may include one or more components of hardware and/or software program code for connecting users by the knowledge management system 100. After the first user responds to the alert provided in the alerting module 136 with a response that the first user wishes to collaborate, the connecting module 135 may determine whether the first user wishes to collaborate anonymously or by displaying a user ID or identity to the second user. Once this is determined, the connecting module 135 may establish a connection between the two users according to their privacy preferences.

In one embodiment, the connecting module 135 provides a first user with contact information of a second user that recently tried to solve the same problem by, for example, entering the same or similar search request. A pop up chat window simultaneously appears on both the first user and the second user's computing device display. In another embodiment, the connecting module 135 may be configured to alert the second user that the first user is trying to solve a problem the second user was previously trying to solve before a connection is established in order to determine that the second user grants permission for a connection to be established. In another embodiment, the receiving module 131 may have already received permission from the second user at the previous time when the second user was attempting to solve the problem. Whatever the embodiment, the connecting module 135 may be configured to connect the first user with the second user.

Figure 4:
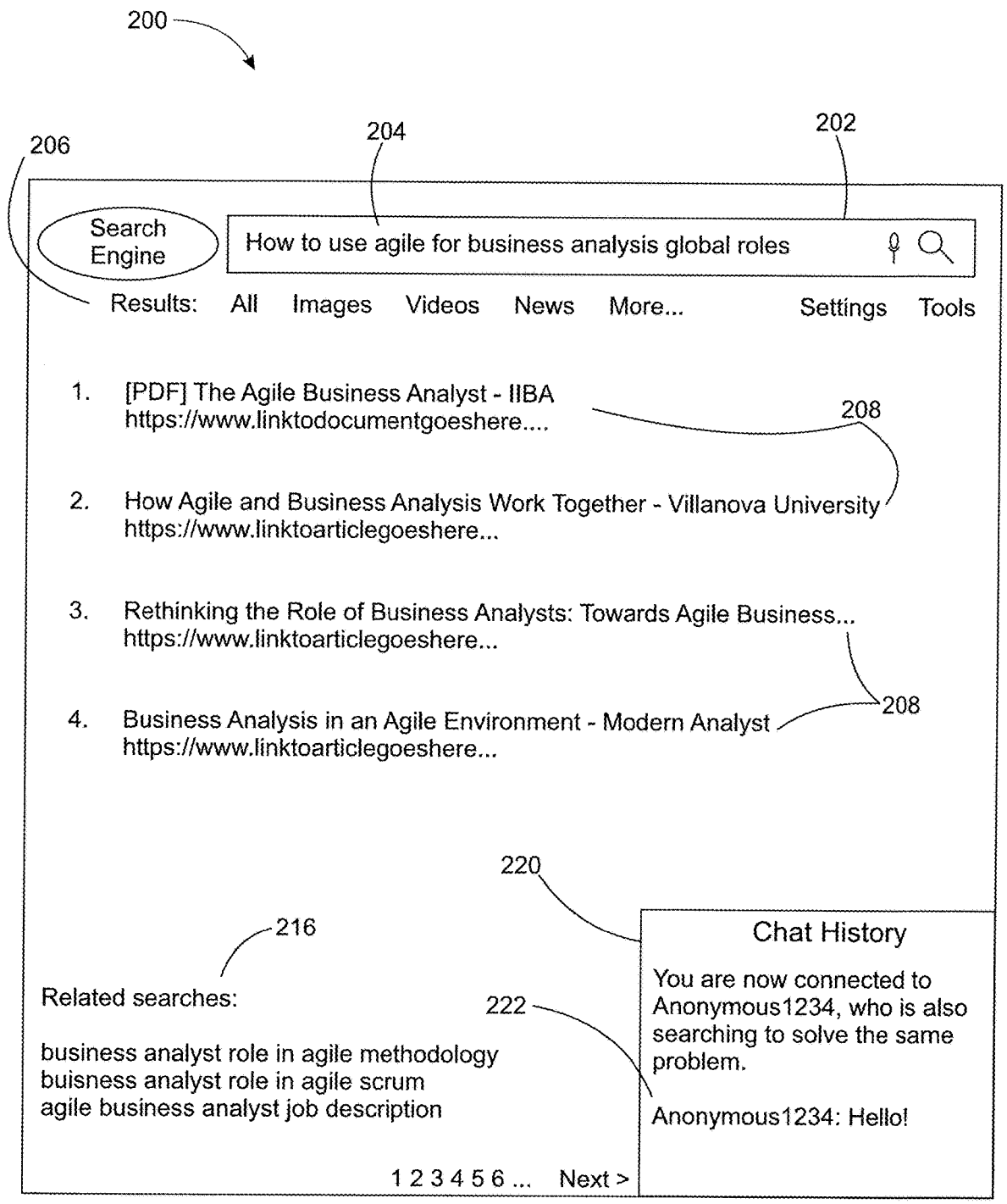
FIG. 4 depicts a search results page of a user with a collaboration environment, in accordance with embodiments of the present invention.

An example embodiment of a connection between two users attempting to solve the same problem is shown in FIG. 4. Here, the search result page 200 is again shown. Rather than showing the alert 210, a pop-up chat window 220 is provided establishing a connection between the first user and the second user. The pop-up chat window 220 allows the users to communicate with text messages 222. The pop-up chat window 220 may be a separate window or may be integrated into an existing window of the user platform 111*a* or the social media platform 111*b*. The connection exemplified in FIG. 4 is not limiting and various other embodiments are contemplated to allow the first and second users to connect, such as through email, text messaging, chatting with a chat interface or the like.

Referring back to FIG. 2, the data repository 125 is shown. The data repository 125 has been described as containing various databases for the knowledge management system 100 including the search engine database 150 and the knowledge management data repository 151, along with the coincidence database 152, the trend database 153, and the collaborator database 154, examples of which are provided in FIGS. 9A-9C. The data repository 125 may be one or more repositories. Further, the data repository may be stored on one or more connected physical servers, for example. As described, each of the databases may actually comprise a plurality of separate databases related to individual problems, searches, collaborations, and the like.

Figure 5:
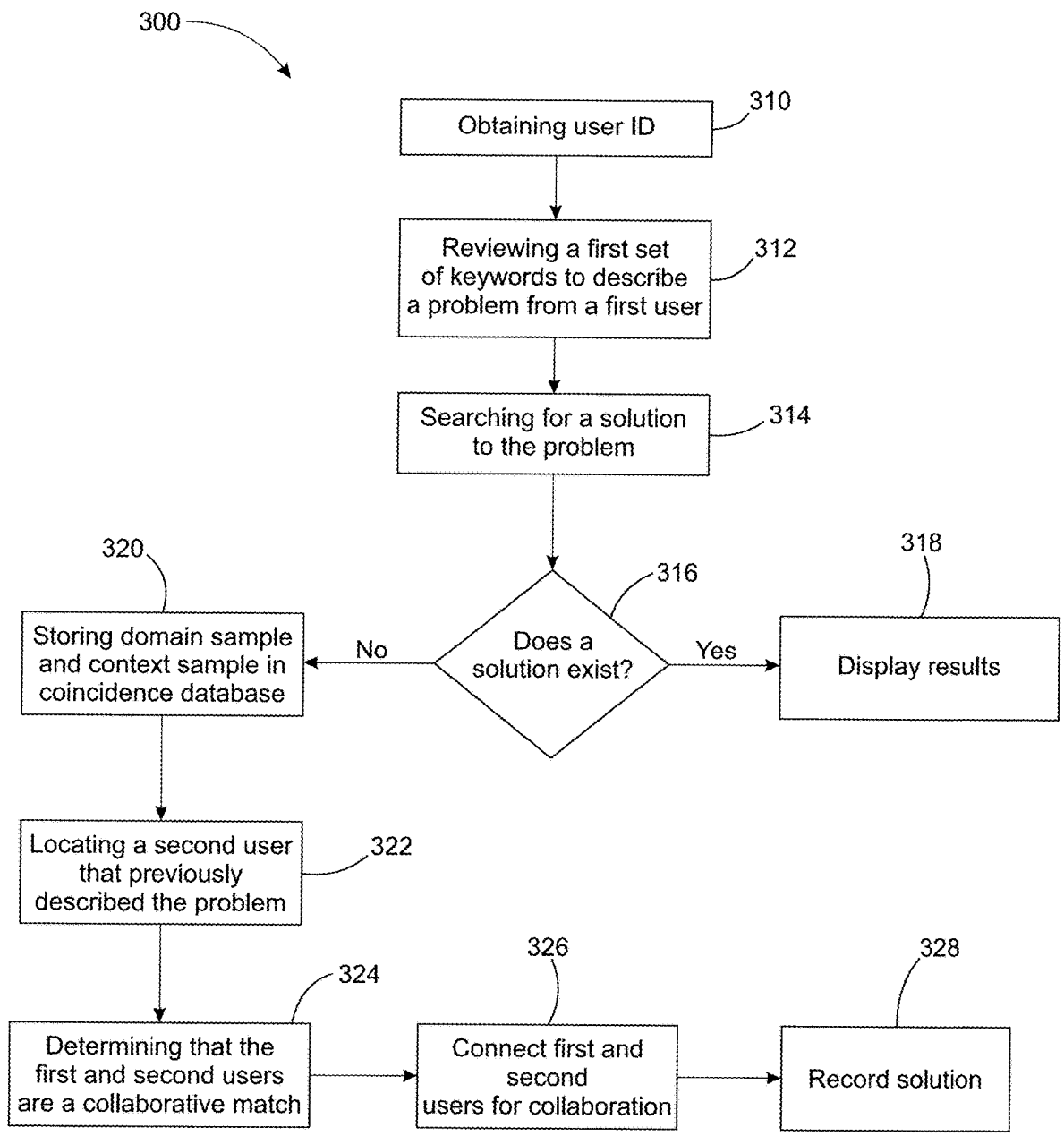
FIG. 5 depicts a flow chart of a method for managing knowledge, in accordance with embodiments of the present invention.

Referring now to FIG. 5, a method for knowledge management by connecting users 300 is shown in accordance to one embodiment. In one embodiment, the method 300 may be an extension of or combined with steps from the other methods described herein. The steps of the method 300 may be incorporated into the other methods described herein. The steps found in method 300 may be used in performing methods including some or all steps from each of the methods described herein. The method steps in the method 400 may provide for connecting users to solve a problem and find a solution.

The method 300 may include a first step 310 of obtaining, by for example a computer processor of the knowledge management system 100, a user ID corresponding to a first user. The method may include a second step 312 of receiving, by for example the receiving module 131, a first set of keywords to describe a first problem by the first user. The first set of keywords may be a search query provided by the first user into a search engine or interface, such as the user platform 111*a* or the social media platform 111*b*. The method may include a next step 314 of searching for a solution to the problem. For example, the searching module 133 may perform this step by searching the search engine database 150 and/or the knowledge management data repository 151.

A next step 316 of the method 300 may include determining, by for example the analytics module 134, whether a solution to the first problem exists in the search engine database 150 and/or the knowledge management data repository 151. This step may further include determining that the same or similar query resulted in other previous users immediately finding acceptable search results with no additional searching necessary. If it is determined that a solution exists, the method 300 may perform a next step 318 of displaying the results. These displayed results may solve the problem adequately that was searched for by the first user. If it is determined that no solution exists in the search engine database 150 and/or the knowledge management data repository 151, the method may continue to a step 320 of storing information related to the received keywords provided by the first user. This information may include a domain sample and a context sample, such as the domain samples in column 162 and the context samples in column 163.

The method 300 may then include a step 322 locating a second user that previously described the same problem or a substantially similar problem, using for example the analytics module 134. The method 300 may include a step 324 of determining, using for example the analytics module 134, that the first and second users are a collaborative match. The method 300 may include a step 326 of connecting, using the connecting module 135, the first and second users for collaboration. Finally, when a solution is found by the first and second users through collaboration, the method 300 may include a step 328 of recording the result of the solution. This step 328 may include requesting the first and second users answer questions about their collaboration. For example, the first and second user may be prompted to answer questions related to the solution found through collaboration. This information may be recorded and stored in the data repository 125.

Figure 6:
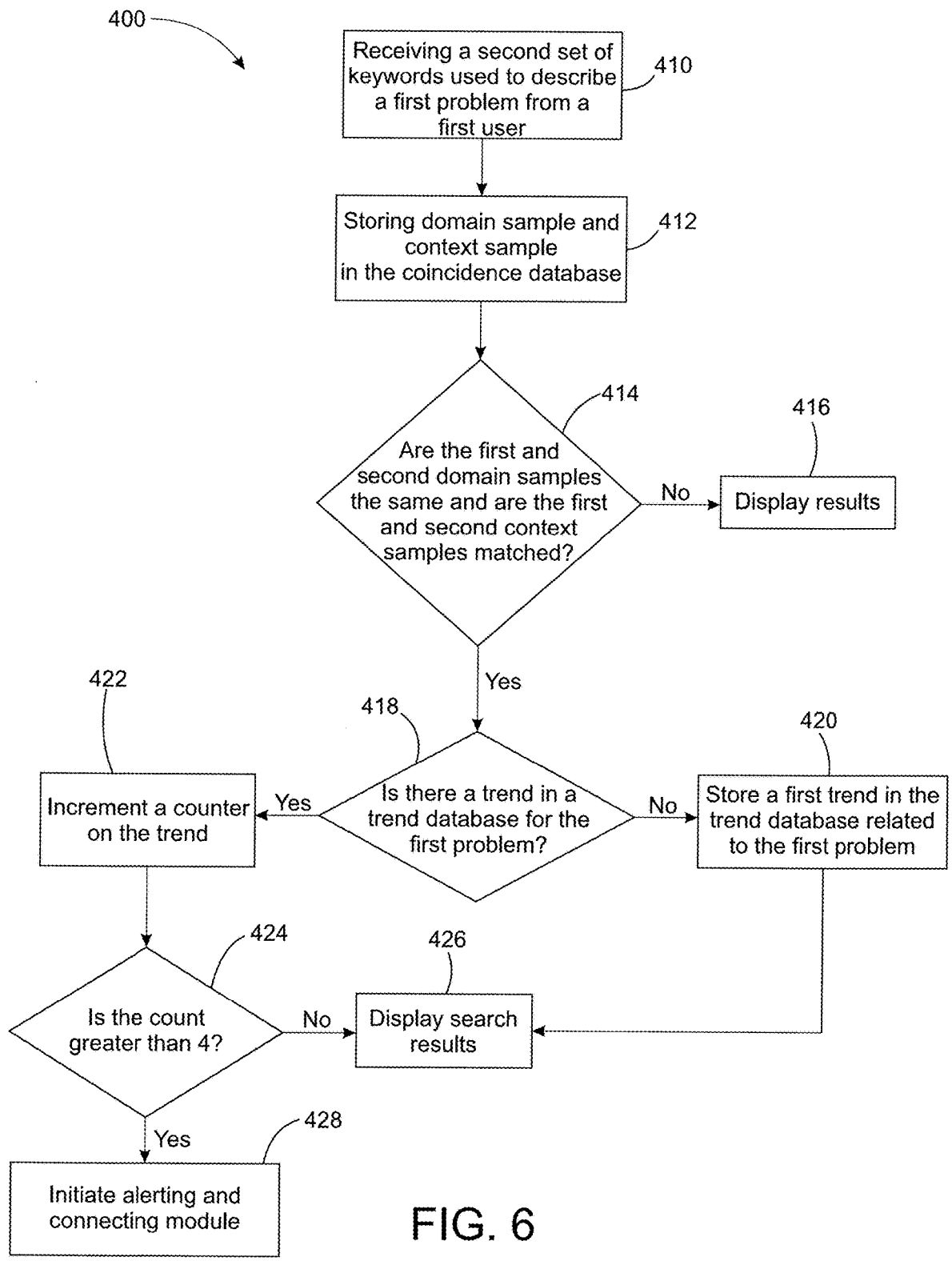
FIG. 6 depicts a flow chart of a method for managing knowledge by saving coincidences, in accordance with embodiments of the present invention.

Referring now to FIG. 6, another method 400 is shown in accordance to one embodiment. In one embodiment, the method 400 may be an extension of or combined with steps from the other methods described herein. The steps of the method 400 may be incorporated into the other methods described herein. The steps found in method 400 may be used in performing methods including some or all steps from each of the methods described herein. The method steps in the method 400 may provide for populating and updating and/or incrementing a trend database, such as the trend database 153.

The method 400 may include a first step 410 of receiving a second set of keywords used to describe a first problem from a first user. The method 400 may include a step 412 of storing a domain sample and a coincidence sample related to the second set of keywords in a coincidence database, such as the coincidence database 152. The method 400 may include a step 414 of determining, by the analytics module 134 for example, whether the first and second domain samples are the same and determining whether the first and second context samples are matched. If the first and second domain samples are not the same or the first and second context samples are not sufficiently matched, the method 400 may include a step 416 of displaying the search results to the user without creating a trend. Alternatively, if a match exists, the method 400 may proceed to step 418 where it is determined, by for example the analytics module 134, if there is a trend in a trend database, such as the trend database 153, which is related to the problem. If it is determined that no trend exists related to the first problem, the method 400 may include a step 420 of storing a first trend in the trend database related to the first problem. If a trend exists, the method 400 may include a step 422 of incrementing a counter, such as a counter in the counter column 174, in the trend database. The method 400 may include a step 424 of determining, by for example the analytics module 134, whether the counter value is greater than three. This counter value could be larger or smaller, depending on the embodiment. A higher value would require more persistence on the part of the user before the knowledge management system 100 attempted to connect the user with a collaborator. If the counter value is not greater than three after being incremented in step 422, the method 400 may include displaying another round of search results to the user without initiating methods to connect the user to another. If, on the other hand, the counter value is greater than three after being incremented in step 422, the method 400 may include initiating the alerting module 136 and the connecting module 135 in order to facilitate connecting the first user with another user attempting, or having previously attempted, to solve the same problem.

Figure 7:
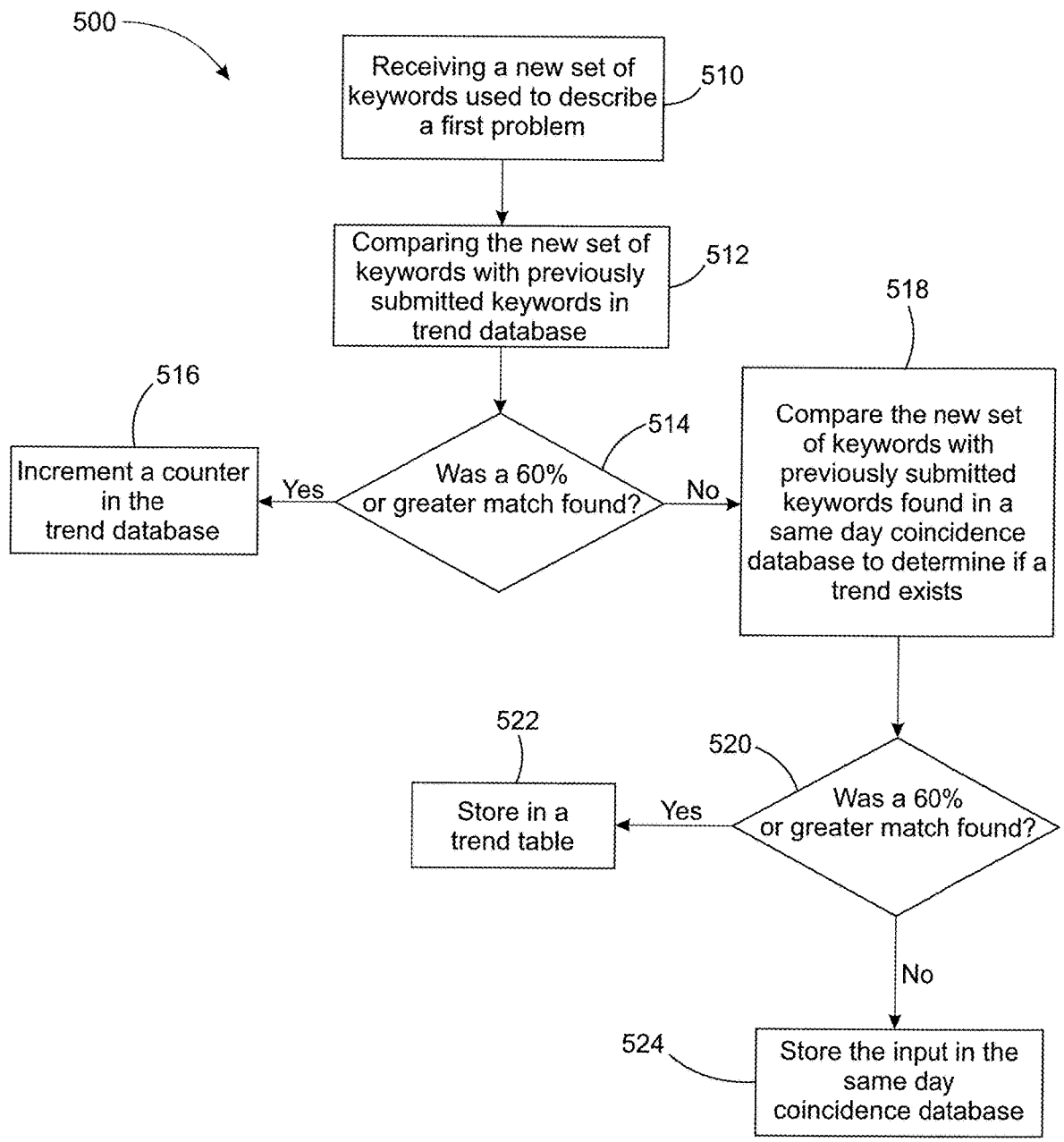
FIG. 7 depicts a flow chart of a method for managing knowledge by comparing keywords, in accordance with embodiments of the present invention.

Referring now to FIG. 7, another method 500 is shown. In one embodiment, the method 500 may be an extension of or combined with steps from the other methods described herein. The steps of the method 500 may be incorporated into the other methods described herein. The steps found in method 500 may be used in performing methods including some or all steps from each of the methods described herein. The method steps in the method 500 may provide for determining whether keywords match. Further, the method 500 may provide an exemplary embodiment for how the knowledge management system 100 may be configured to store information in the coincidence database 152 and the trend database 153.

The method 500 may include a first step 510 of receiving a new or second set of keywords to describe a first problem. The method may include a step 512 of comparing the new set of keywords with previously submitted keywords in a trend database, such as the trend database 153. The method 500 may include a step 514 of determining, using for example a plain language cognitive tool, whether a 60% or greater confidence threshold level is found. This confidence level may relate to an analysis performed by the analytics module 134 related to a context sample from the new set of keywords compared to a context sample from an old set of keywords. Other embodiments contemplate using the plain language cognitive tool or another tool in other ways to determine if the searches and/or keywords contained in the searches and/or context samples of the searches are matching. Furthermore, other percentages higher or lower than 60% are contemplated depending on the embodiment and how sensitive the knowledge management system 100 is desired to be for user problem description variance. If a match is found in the trend database where the confidence threshold determined by the plain language cognitive tool is greater than 60%, for example, the method 500 may include a step 516 of incrementing the counter in the trend database by one.

If no match is found, the method 500 may include the step 518 of comparing the new set of keywords with previously submitted keywords found in a same-day coincidence database, such as the coincidence database 152, to determine if a trend exists. The coincidence database may be considered a same day database, because the database may be configured to delete entries after 24 hours. In contrast, the trend database(s) described herein may have longer retention periods, such as week(s), month(s), quarter(s), or year(s). The method 500 may then include a step 520 of determining if a 60% or greater (for example) confidence threshold level is found between the new set of keywords and an entry having an old set of keywords in the same day coincidence database. Again, this confidence level may relate to an analysis performed by the analytics module 134 related to a context sample from the new set of keywords compared to a context sample from an old set of keywords found in the coincidence database. Other embodiments contemplate using the plain language cognitive tool or another tool in other ways to determine if the searches and/or keywords contained in the searches and/or context samples of the searches are matching. Furthermore, other percentages higher or lower than 60% are contemplated depending on the embodiment and how sensitive the knowledge management system 100 is desired to be for user problem description variance. If a match is found in the same-day coincidence database, the method 500 may include a step 522 of creating and/or storing a new input in the trend table having a counter set to one, for example. If no match is found in the same-day coincidence database, the method 500 may include a step 524 of storing an entry or input related to the new set of keywords in the same day coincidence database.

Figure 8:
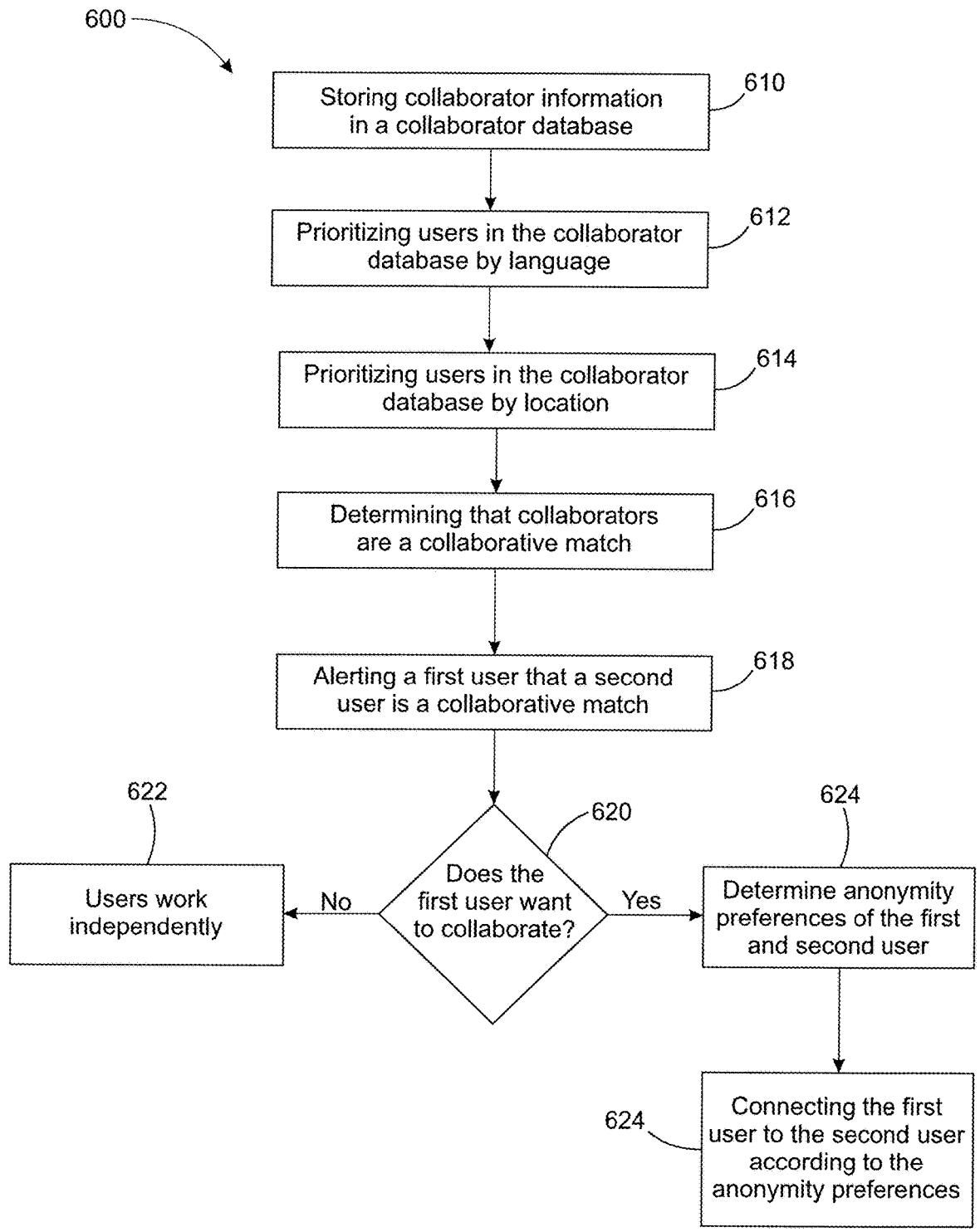
FIG. 8 depicts a flow chart of a method for managing knowledge by storing trends, in accordance with embodiments of the present invention.

Referring now to FIG. 8, another method 600 is shown. In one embodiment, the method 600 may be an extension of or combined with steps from the other methods described herein. The steps of the method 600 may be incorporated into the other methods described herein. The steps found in method 600 may be used in performing methods including some or all steps from each of the methods described herein. The method steps in the method 600 may provide for connecting collaborators working to solve the same problem and managing potential collaborators or users in a collaborator database.

The method 600 may include a first step 610 of storing collaborator information in a collaborator database, such as the collaborator database 154. This collaborator information may include a collaborator ID in a collaborator ID column, such as column 181, a collaborator location from a collaborator location column, such as column 182, and/or a collaborator language in a collaborator language column, such as column 183. Other information may be provided in the collaborator database. Furthermore the collaborator database may be created when a problem is determined by the knowledge management system 100, such as by the analytics module 134, to exist that has not yet been solved or that multiple users are attempting to solve. This may occur when one more users provide multiple search requests or problem solving requests to establish a trend stored in a trend database, such as the database 153.

The method 600 may then include a step 612 of prioritizing users in the collaborator database by language, and a step 614 of prioritizing users in the collaborator database by location. In other embodiments, other prioritizations are contemplated, such as whether users are using the same Akamai server. The method 600 may include a step 616 of determining that two users or collaborators are a collaborative match. For example, if there are 4 potential users attempting to solve the same problem, the method 600 may include selecting a second user that is best suited to collaborate with a first user based on location, language, and the like. The method 600 may then include a step 618 of alerting the first user that the second user is a collaborative match. The method may then include initiating determining privacy settings and establishing a connection between users.

Figure 10:
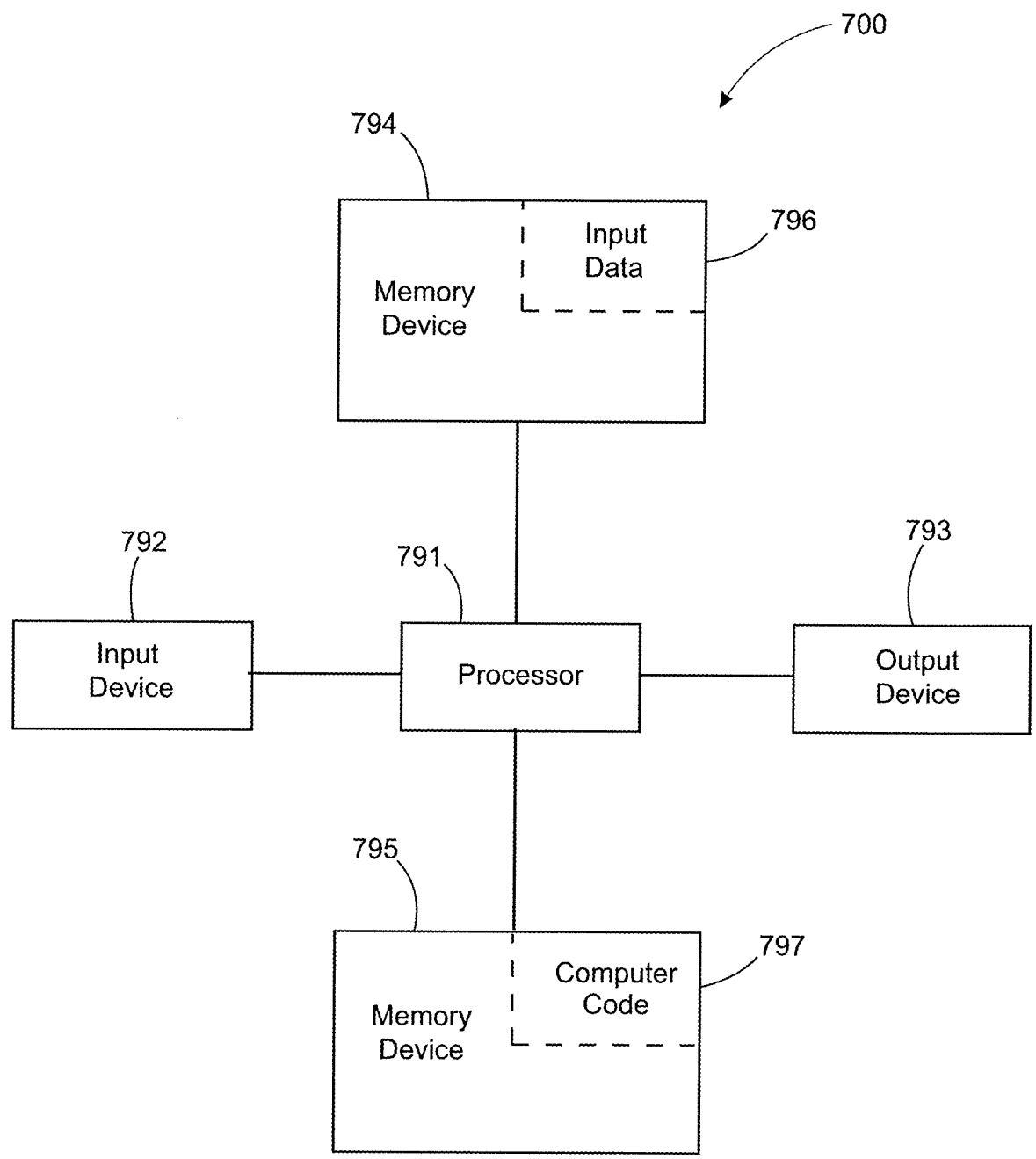
FIG. 10 depicts a block diagram of a computer system for the knowledge management system of FIG. 1, capable of implementing methods for managing knowledge of FIGS. 5-8 using the databases of FIGS. 9A-9C, in accordance with embodiments of the present invention.

FIG. 10 depicts a block diagram of a computer system for the knowledge management system of FIG. 1, capable of implementing methods for knowledge management by connecting users of FIGS. 5-8 using, for example, the tables of FIGS. 9A-9C, in accordance with embodiments of the present invention. The computer system 700 may generally comprise a processor 791, an input device 792 coupled to the processor 791, an output device 793 coupled to the processor 791, and memory devices 794 and 795 each coupled to the processor 791. The input device 792, output device 793 and memory devices 794, 795 may each be coupled to the processor 791 via a bus. Processor 791 may perform computations and control the functions of computer 700, including executing instructions included in the computer code 797 for the tools and programs capable of implementing a method for knowledge management by connecting users in the manner prescribed by the embodiments of FIGS. 4-7 using the knowledge management system 100 of FIG. 1, wherein the instructions of the computer code 797 may be executed by processor 791 via memory device 795. The computer code 797 may include software or program instructions that may implement one or more algorithms for implementing the methods for knowledge management by connecting users, as described in detail above. The processor 791 executes the computer code 797. Processor 791 may include a single processing unit, or may be distributed across one or more processing units in one or more locations (e.g., on a client and server).

The memory device 794 may include input data 796. The input data 796 includes any inputs required by the computer code 797. The output device 793 displays output from the computer code 797. Either or both memory devices 794 and 795 may be used as a computer usable storage medium (or program storage device) having a computer-readable program embodied therein and/or having other data stored therein, wherein the computer-readable program comprises the computer code 797. Generally, a computer program product (or, alternatively, an article of manufacture) of the computer system 700 may comprise said computer usable storage medium (or said program storage device).

Memory devices 794, 795 include any known computer-readable storage medium, including those described in detail below. In one embodiment, cache memory elements of memory devices 794, 795 may provide temporary storage of at least some program code (e.g., computer code 797) in order to reduce the number of times code must be retrieved from bulk storage while instructions of the computer code 797 are executed. Moreover, similar to processor 791, memory devices 794, 795 may reside at a single physical location, including one or more types of data storage, or be distributed across a plurality of physical systems in various forms. Further, memory devices 794, 795 can include data distributed across, for example, a local area network (LAN) or a wide area network (WAN). Further, memory devices 794, 795 may include an operating system (not shown) and may include other systems not shown in FIG. 6.

In some embodiments, the computer system 700 may further be coupled to an Input/output (I/O) interface and a computer data storage unit. An I/O interface may include any system for exchanging information to or from an input device 792 or output device 793. The input device 792 may be, inter alia, a keyboard, a mouse, etc. or in some embodiments the touchscreen of a computing device. The output device 793 may be, inter alia, a printer, a plotter, a display device (such as a computer screen), a magnetic tape, a removable hard disk, a floppy disk, etc. The memory devices 794 and 795 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 700, and may include any type of transmission link, including electrical, optical, wireless, etc.

An I/O interface may allow computer system 700 to store information (e.g., data or program instructions such as program code 797) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIGS. 1 and 2.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to identification validation systems and methods. Thus, an embodiment of the present invention discloses a process for supporting computer infrastructure, where the process includes providing at least one support service for at least one of integrating, hosting, maintaining and deploying computer-readable code (e.g., program code 797) in a computer system (e.g., computer 700) including one or more processor(s) 791, wherein the processor(s) carry out instructions contained in the computer code 797 causing the computer system to perform the method for knowledge management by connecting users. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for knowledge management by connecting users. Thus, the present invention discloses a process for supporting, deploying and/or integrating computer infrastructure, integrating, hosting, maintaining, and deploying computer-readable code into the computer system 700, wherein the code in combination with the computer system 700 is capable of performing a method for knowledge management by connecting users.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
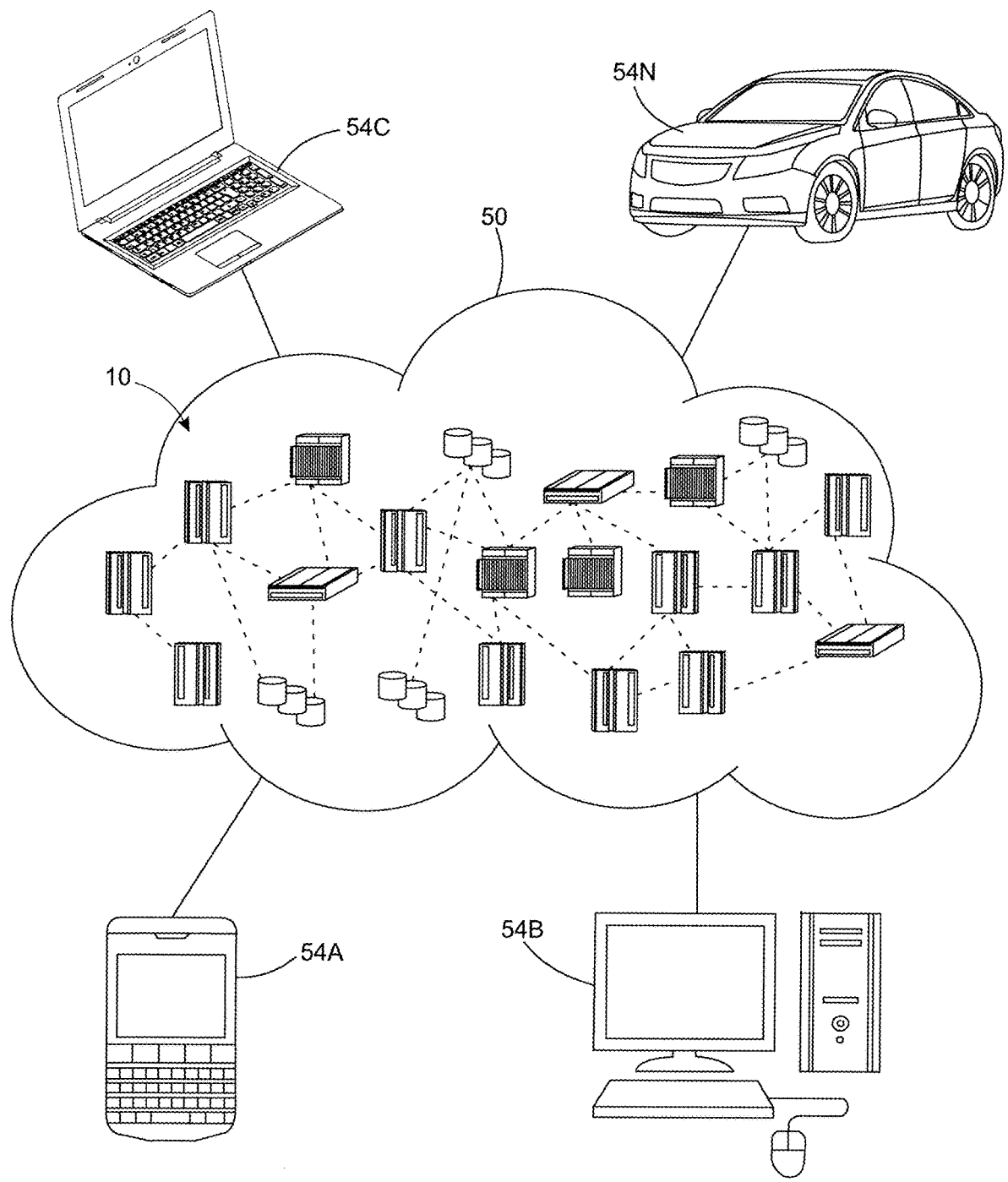
FIG. 11 depicts a cloud computing environment, in accordance with embodiments of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 10 are intended to be illustrative only and that computing nodes 10 and cloud computing environment 50 can communicate with any type of computerized device over any type of network and/or network addressable connection (e.g., using a web browser).

Figure 12:
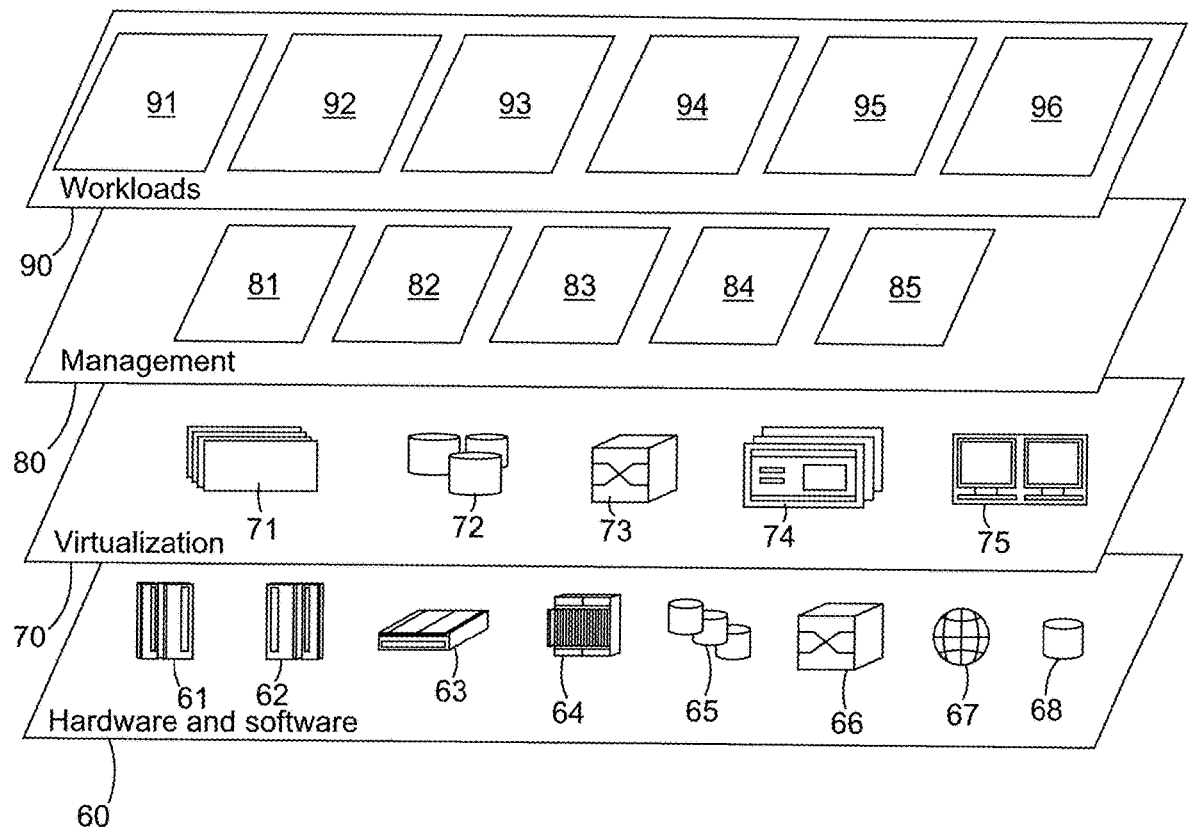
FIG. 12 depicts abstraction model layers, in accordance with embodiments of the present invention.

Referring now to FIG. 12, a set of functional abstraction layers provided by cloud computing environment 50 (see FIG. 11) are shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and knowledge management 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method for knowledge management by connecting users, the method comprising:

receiving, by a processor of a computing system, a first set of keywords used to describe a first problem from a first user;

storing, by the processor in a coincidence database, a first domain sample related to a domain of the first problem, and a first context sample from the first set of keywords;

searching, by the processor, a knowledge management data repository containing potential solutions to the first problem;

determining, by the processor, that a solution to the first problem does not exist in the knowledge management repository;

receiving, by the processor, a second set of keywords used to describe the first problem from the first user;

storing, by the processor in the coincidence database, a second domain sample related to the domain of the first problem, and a second context sample from the second set of keywords;

determining, by the processor, that the first domain sample and the second domain sample are the same;

determining, by the processor, that the first context sample and the second context sample are matched; and after the determining that the first domain sample and the second domain sample are the same and that the first context sample and the second context sample are matched, storing, by the processor, a first trend in a trend database;

locating, by the processor, a second user that has previously described the first problem, wherein the locating, by the processor, the second user occurs after the first trend is stored in the trend database;

determining, by the processor, that the first user and the second user are a collaborative match;

connecting, by the processor, the first user to the second user.

2. The method of claim 1,
wherein-the first trend includes:
a first domain trend containing information from the first domain sample and the second domain sample;
a first context trend containing information from the first context sample and the second context sample;
a user ID for the first user
a first counter set to one; and
a first time stamp.

3. The method of claim 2, further comprising:
incrementing, by the processor, the first counter each time a new set of key words is used to describe the first problem by the first user;
deleting, by the processor, the first trend from the trend database after a predetermined time passes without a new set of keywords being used to describe the first problem by the first user, wherein the predetermined time depends on the value of the counter, wherein a higher value of the counter provides for a longer the predetermined time.

4. The method of claim 2, wherein the determining that the first context sample and the second context sample are matched includes using a natural language cognition tool to determine that a coincidence level is above a threshold.

5. The method of claim 2, further comprising:
receiving, by the processor, a third set of keywords used to describe the first problem from the second user;
storing, by the processor in the coincidence database, a third domain sample related to a location of the second user, and a third context sample from the third set of keywords;
receiving, by the processor, a fourth set of keywords used to describe the first problem from the second user;
storing, by the processor in the coincidence database, a fourth domain sample related to the location of the second user, and a fourth context sample from the fourth set of keywords;
determining, by the processor, that the third domain sample and the fourth domain sample are the same;
determining, by the processor, that the third context sample and the fourth context sample are matched; and
after the determining that the third domain sample and the fourth domain sample are the same and that the third context sample and the fourth context sample are matched, storing, by the processor, a second trend in the trend database, the second trend including:
a second domain trend containing information from the third domain sample and the fourth domain sample;
a second context trend containing information from the third context sample and the fourth context sample;
a second user ID for the second user;
a second counter set to one; and
a second time stamp,
wherein the locating the second user that has previously described the first problem further comprises determining, by the processor, that the first trend and the second trend are matched.

6. The method of claim 3, further comprising:
alerting, by the processor, the first user that the second user exists who is working to solve the first problem;
querying, by the processor, whether the first user would like to work with the second user to solve the first problem;
querying, by the processor, whether the first user would like to work anonymously with the second user to solve the first problem;
wherein the connecting the first user to the second user includes providing, by the processor, a messaging interface to allow the first user to message the second user.

7. The method of claim 3, further comprising:
after storing the first trend in the trend database, storing, by the processor in a collaborator database:
the first user ID;
a language of the first user; and
a location of the first user;
after storing the second trend in the trend database, storing, by the processor in the collaborator database:
the second user ID;
a language of the second user; and
a location of the second user,
wherein the determining that the first user and the second user are a collaborative match includes prioritizing the second user above other users working to solve the first problem located in the collaborator database because the second user shares a language with the first user and the second user is proximately located to the first user.

8. A computer system, comprising:
a processor;
a memory device coupled to the processor; and
a computer readable storage device coupled to the processor, wherein the storage device contains program code executable by the processor via the memory device to implement a method for knowledge management by connecting users, the method comprising:
receiving, by the processor, a first set of keywords used to describe a first problem from a first user;
storing, by the processor in a coincidence database, a first domain sample related to a domain of the first problem, and a first context sample from the first set of keywords;
searching, by the processor, a knowledge management repository containing potential solutions to the first problem;
determining, by the processor, that a solution to the first problem does not exist in the knowledge management repository;
receiving, by the processor, a second set of keywords used to describe the first problem from the first user;
storing, by the processor in the coincidence database, a second domain sample related to the domain of the first problem, and a second context sample from the second set of keywords;
determining, by the processor, that the first domain sample and the second domain sample are the same;
determining, by the processor, that the first context sample and the second context sample are matched; and
after the determining that the first domain sample and the second domain sample are the same and that the first context sample and the second context sample are matched, storing, by the processor, a first trend in a trend database;
locating, by the processor, a second user that has previously described the first problem, wherein the locating, by the processor, the second user occurs after the first trend is stored in the trend database;
determining, by the processor, that the first user and the second user are a collaborative match;
connecting, by the processor, the first user to the second user.

9. The computer system of claim 8,
wherein the first trend includes:
a first domain trend containing information from the first domain sample and the second domain sample;
a first context trend containing information from the first context sample and the second context sample;
a user ID for the first user
a first counter set to one; and
a first time stamp.

10. The computer system of claim 9, wherein the method further comprises:
incrementing, by the processor, the first counter each time a new set of key words is used to describe the first problem by the first user;
deleting, by the processor, the first trend from the trend database after a predetermined time passes without a new set of keywords being used to describe the first problem by the first user, wherein the predetermined time depends on the value of the counter, wherein a higher value of the counter provides for a longer the predetermined time.

11. The computer system of claim 9, wherein the determining that the first context sample and the second context sample are matched includes using a natural language cognition tool to determine that a coincidence level is above a threshold.

12. The computer system of claim 9, the method further comprising:
receiving, by the processor, a third set of keywords used to describe the first problem from the second user;
storing, by the processor in the coincidence database, a third domain sample related to a location of the second user, and a third context sample from the third set of keywords;
receiving, by the processor, a fourth set of keywords used to describe the first problem from the second user;
storing, by the processor in the coincidence database, a fourth domain sample related to the location of the second user, and a fourth context sample from the fourth set of keywords;
determining, by the processor, that the third domain sample and the fourth domain sample are the same;
determining, by the processor, that the third context sample and the fourth context sample are matched; and
after the determining that the third domain sample and the fourth domain sample are the same and that the third context sample and the fourth context sample are matched, storing, by the processor, a second trend in the trend database, the second trend including:
a second domain trend containing information from the third domain sample and the fourth domain sample;
a second context trend containing information from the third context sample and the fourth context sample;
a second user ID for the second user;
a second counter set to one; and
a second time stamp,
wherein the locating the second user that has previously described the first problem further comprises determining, by the processor, that the first trend and the second trend are matched.

13. The computer system of claim 12, the method further comprising:
alerting, by the processor, the first user that the second user exists who is working to solve the first problem;
querying, by the processor, whether the first user would like to work with the second user to solve the first problem;
querying, by the processor, whether the first user would like to work anonymously with the second user to solve the first problem;
wherein the connecting the first user to the second user includes providing, by the processor, a messaging interface to allow the first user to message the second user.

14. The computer system of claim 12, the method further comprising:
after storing the first trend in the trend database, storing, by the processor in a collaborator database:
the first user ID;
a language of the first user; and
a location of the first user;
after storing the second trend in the trend database, storing, by the processor in the collaborator database:
the second user ID;
a language of the second user; and
a location of the second user,
wherein the determining that the first user and the second user are a collaborative match includes prioritizing the second user above other users working to solve the first problem located in the collaborator database because the second user shares a language with the first user and the second user is proximately located to the first user.

15. A computer program product, comprising a computer readable hardware storage device storing a computer readable program code, the computer readable program code comprising an algorithm that when executed by a processor of a computing system implements a method for knowledge management by connecting users, the method comprising:
receiving, by the processor, a first set of keywords used to describe a first problem from a first user;
storing, by the processor in a coincidence database, a first domain sample related to a domain of the first problem, and a first context sample from the first set of keywords;
searching, by the processor, a knowledge management repository containing potential solutions to the first problem;
determining, by the processor, that a solution to the first problem does not exist in the knowledge management repository;
receiving, by the processor, a second set of keywords used to describe the first problem from the first user;
storing, by the processor in the coincidence database, a second domain sample related to the domain of the first problem, and a second context sample from the second set of keywords;
determining by the processor, that the first domain sample and the second domain sample are the same;
determining, by the processor, that the first context sample and the second context sample are matched; and
after the determining that the first domain sample and the second domain sample are the same and that the first context sample and the second context sample are matched, storing, by the processor, a first trend in a trend database;
locating, by the processor, a second user that has previously described the first problem, wherein the locating, by the processor, the second user occurs after the first trend is stored in the trend database;
determining, by the processor, that the first user and the second user are a collaborative match;
connecting, by the processor, the first user to the second user.

16. The computer program product of claim 15, wherein the first trend includes:
- a first domain trend containing information from the first domain sample and the second domain sample;
- a first context trend containing information from the first context sample and the second context sample;
- a user ID for the first user a first counter set to one; and
- a first time stamp.

17. The computer program product of claim 16, wherein the method further comprises:
- incrementing, by the processor, the first counter each time a new set of key words is used to describe the first problem by the first user;
- deleting, by the processor, the first trend from the trend database after a predetermined time passes without a new set of keywords being used to describe the first problem by the first user, wherein the predetermined time depends on the value of the counter, wherein a higher value of the counter provides for a longer the predetermined time.

18. The computer program product of claim 16, the method further comprising:
- receiving, by the processor, a third set of keywords used to describe the first problem from the second user;
- storing, by the processor in the coincidence database, a third domain sample related to a location of the second user, and a third context sample from the third set of keywords;
- receiving, by the processor, a fourth set of keywords used to describe the first problem from the second user;
- storing, by the processor in the coincidence database, a fourth domain sample related to the location of the second user, and a fourth context sample from the fourth set of keywords;
- determining, by the processor, that the third domain sample and the fourth domain sample are the same;
- determining, by the processor, that the third context sample and the fourth context sample are matched; and
- after the determining that the third domain sample and the fourth domain sample are the same and that the third context sample and the fourth context sample are matched, storing, by the processor, a second trend in the trend database, the second trend including:
  - a second domain trend containing information from the third domain sample and the fourth domain sample;
  - a second context trend containing information from the third context sample and the fourth context sample;
  - a second user ID for the second user;
  - a second counter set to one; and
  - a second time stamp,
- wherein the locating the second user that has previously described the first problem further comprises determining, by the processor, that the first trend and the second trend are matched.

19. The computer program product of claim 18, the method further comprising:
- alerting, by the processor, the first user that the second user exists who is working to solve the first problem;
- querying, by the processor, whether the first user would like to work with the second user to solve the first problem;
- querying, by the processor, whether the first user would like to work anonymously with the second user to solve the first problem;
- wherein the connecting the first user to the second user includes providing, by the processor, a messaging interface to allow the first user to message the second user.

20. The computer program product of claim 18, the method further comprising:
- after storing the first trend in the trend database, storing, by the processor in a collaborator database:
  - the first user ID;
  - a language of the first user; and
  - a location of the first user;
- after storing the second trend in the trend database, storing, by the processor in the collaborator database:
  - the second user ID;
  - a language of the second user; and
  - a location of the second user,
- wherein the determining that the first user and the second user are a collaborative match includes prioritizing the second user above other users working to solve the first problem located in the collaborator database because the second user shares a language with the first user and the second user is proximately located to the first user.

* * * * *